United States Patent
Beaujot

(10) Patent No.: US 12,433,189 B2
(45) Date of Patent: Oct. 7, 2025

(54) AGRICULTURAL PRODUCT TRANSFER TO AIR SEEDER TANKS

(71) Applicant: SeedMaster Manufacturing Ltd., Emerald Park (CA)

(72) Inventor: Norbert Beaujot, Emerald Park (CA)

(73) Assignee: SeedMaster Manufacturing Ltd., Saskatchewan (CA)

(*) Notice: Subject to any disclaimer, the term of this patent is extended or adjusted under 35 U.S.C. 154(b) by 889 days.

(21) Appl. No.: 17/565,130

(22) Filed: Dec. 29, 2021

(65) Prior Publication Data

US 2023/0200290 A1 Jun. 29, 2023

(51) Int. Cl.
*A01C 15/00* (2006.01)
*A01C 7/08* (2006.01)
*A01C 7/20* (2006.01)

(52) U.S. Cl.
CPC ............. *A01C 7/20* (2013.01); *A01C 7/081* (2013.01); *A01C 15/003* (2013.01)

(58) Field of Classification Search
CPC .. A01C 7/20; A01C 7/081; A01C 7/18; A01C 15/003; A01C 15/005; A01C 15/006; A01C 15/12; A01B 79/00; A01B 79/02; A01B 79/005
See application file for complete search history.

(56) References Cited

U.S. PATENT DOCUMENTS

| | | | |
|---|---|---|---|
| 3,949,850 A | 4/1976 | Schumm | |
| 5,379,706 A * | 1/1995 | Gage | A01C 15/04 406/146 |
| 5,601,181 A * | 2/1997 | Lindhorst | B65G 11/083 193/25 E |
| 7,267,519 B2 * | 9/2007 | Cresswell | A01C 15/003 198/313 |
| 7,500,814 B2 * | 3/2009 | Meyer | A01C 15/003 414/920 |
| 8,733,257 B2 * | 5/2014 | Beaujot | A01C 7/20 111/200 |
| 8,876,456 B2 | 11/2014 | Kowalchuk et al. | |
| 9,148,990 B2 * | 10/2015 | Redman | A01C 7/081 |
| 9,844,185 B2 * | 12/2017 | Renyer | A01D 90/00 |
| 9,944,211 B2 * | 4/2018 | Petersen | A01C 15/003 |
| 10,104,833 B2 * | 10/2018 | Beaujot | B65G 65/42 |
| 11,013,167 B2 * | 5/2021 | Czapka | B65D 43/161 |
| 11,407,350 B2 * | 8/2022 | Wood | A01C 15/003 |
| 2014/0343723 A1 * | 11/2014 | Meier | B65G 41/002 700/230 |
| 2016/0304300 A1 * | 10/2016 | Beaujot | B65G 65/42 |
| 2019/0152714 A1 * | 5/2019 | Brechon | B65G 41/008 |
| 2021/0362790 A1 * | 11/2021 | Pikesh | A01C 15/003 |
| 2023/0329148 A1 * | 10/2023 | Meier | A01B 79/005 |

* cited by examiner

Primary Examiner — Jamie L McGowan
(74) Attorney, Agent, or Firm — Nixon & Vanderhye P.C.

(57) ABSTRACT

A conveyor apparatus includes a conveyor sloping upward from a lower conveyor intake to an upper conveyor discharge and with a downspout extending down from the conveyor discharge. Wheels support the conveyor for movement along the ground, and a downspout control is operative to remotely move a bottom end of the downspout radially with respect to the conveyor discharge. A method is provided as well for using the conveyor to conveniently transfer a first agricultural product from a first transport vehicle to a first tank on the air seeder cart, and for transferring a second agricultural product from a second transport vehicle to a second tank.

12 Claims, 5 Drawing Sheets

AGRICULTURAL PRODUCT TRANSFER TO AIR SEEDER TANKS

This disclosure relates to the field of agricultural implements and in particular relates to transferring agricultural products from a transport vehicle into a plurality of tanks on an air seeder cart.

BACKGROUND

Air seeders typically include a seeding implement with an implement frame mounted on wheels, and furrow openers spaced across a width of the implement frame. An air seeder cart is towed either forward of or behind the seeding implement and carries a plurality of tanks, typically of different sizes and containing agricultural products such as seeds, fertilizers, chemicals, and the like.

During seeding operations the agricultural products are dispensed on the field and it is required to replenish the various agricultural products by transferring each product from a selected compartment on a transport vehicle into a selected corresponding tank on the air seeder cart. This transfer is typically accomplished with a conveyor.

Conveyors can be mounted on the air seeder cart as disclosed for example in U.S. Pat. No. 8,876,456 to Kowalchuk et al. and U.S. Pat. No. 7,267,519 to Cresswell et al. The conveyor can also be mounted on the transport vehicle as disclosed in U.S. Pat. No. 9,844,185 to Renyer and U.S. Pat. No. 9,944,211 to Petersen.

U.S. Pat. No. 10,104,833 to the present inventor Beaujot et al. discloses a conveyor mounted on a transport vehicle and configured to transfer agricultural products from the transport vehicle to the air seeder cart tanks while moving along the ground. U.S. Pat. No. 8,733,257, also to Beaujot et al., discloses remote control of the lids on each tank on the air seeder cart Weighing systems and cameras are also disclosed and are used to determine the weight of agricultural products transferred, and cameras are also used to position the conveyor discharge and determine fill levels in the tanks.

SUMMARY OF THE INVENTION

The present disclosure provides a conveyor system that overcomes problems in the prior art.

These conveyors then have limited utility as they form an integral part of the air seeder cart or transport vehicle, and so are not available for use in other agricultural conveying operations such as transferring from a storage bin into a transport vehicle, or vice versa.

In a first embodiment the present disclosure provides, in an air seeder comprising a furrow opener implement and an air seeder cart towed by a tractor, a method for transferring a first agricultural product from a first transport vehicle to a first tank mounted on the air seeder cart and transferring a second agricultural product from a second transport vehicle to a second tank mounted on the air seeder cart. The method comprises providing a conveyor sloping upward from a lower conveyor intake to an upper conveyor discharge and with a downspout extending down from the conveyor discharge; wherein the conveyor is supported on right and left conveyor drive wheels and on a caster wheel; providing a wheel drive operative to rotate the right and left conveyor drive wheels together about a rotational axis oriented substantially perpendicular to a length of the conveyor such that the conveyor rolls along a conveyor path substantially aligned with the length of the conveyor; providing an intake elevator operative to selectively raise and lower the conveyor intake, and a discharge elevator operative to selectively raise and lower the conveyor discharge; providing a discharge camera mounted on the conveyor and oriented to look downward from the conveyor discharge and send discharge images to a camera display and an intake camera mounted on the conveyor and oriented to look toward from the conveyor intake and send intake images to the camera display; opening a first lid covering a first fill opening on the first tank and opening a second lid covering a second fill opening on the second tank prior to transferring the first and second agricultural products; positioning the first transport vehicle, the conveyor, and the air seeder cart such that the conveyor intake receives the first agricultural product from a discharge chute of the first transport vehicle and adjusting a radial position of a bottom end of the downspout with respect to the conveyor discharge and with respect to the first fill opening such that the first agricultural product is directed into the first fill opening; operating the conveyor and starting a flow of the first product from the first transport vehicle to deposit the first agricultural product into the conveyor intake while monitoring the conveyor intake on the camera display; monitoring the discharge of the first agricultural product into the first fill opening on the camera display and when the first agricultural product in the first tank reaches a desired level, stopping the flow of the first product from the first transport vehicle and continuing to operate the conveyor until the conveyor is substantially empty; raising the conveyor discharge and rolling the conveyor along the conveyor path towards the air seeder cart; moving the first transport vehicle away from the air seeder cart and moving the second transport vehicle such that a discharge chute of the second transport vehicle is substantially aligned along the conveyor path with the conveyor; rolling the conveyor along the conveyor path toward the second transport vehicle and moving the air seeder cart until the intake images show that the conveyor intake is in a position to receive the second agricultural product from a discharge chute of the second transport vehicle and the discharge images indicate that the second fill opening is within reach of the downspout; remotely adjusting the radial position of the bottom end of the downspout with respect to the conveyor discharge while lowering the conveyor discharge to a position where the second agricultural product discharged from the downspout enters the second fill opening; starting the conveyor and starting a flow of the second product from the second discharge chute to deposit the second agricultural product into the conveyor intake while monitoring the conveyor intake on the camera display; monitoring the discharge of the second agricultural product into the second fill opening on the camera display and when the second agricultural product in the second tank reaches a desired level, stopping the flow of the second product from the second discharge chute and continuing to operate the conveyor until the conveyor is substantially empty; raising the conveyor discharge and closing the first and second lids.

In a second embodiment the present disclosure provides a conveyor apparatus comprising a conveyor sloping upward from a lower conveyor intake to an upper conveyor discharge and with a downspout extending down from the conveyor discharge. Wheels support the conveyor for movement along the ground, and a downspout control is operative to remotely move a bottom end of the downspout radially with respect to the conveyor discharge.

The present disclosure provides a method of using a conveyor to fill tanks on air seeder carts, and also provides a conveyor suitable for the method which is not an integral part of an air seeder cart or a transport vehicle, and is thus available for other conveying operations, such as from a bin to a transport vehicle, or vice versa.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
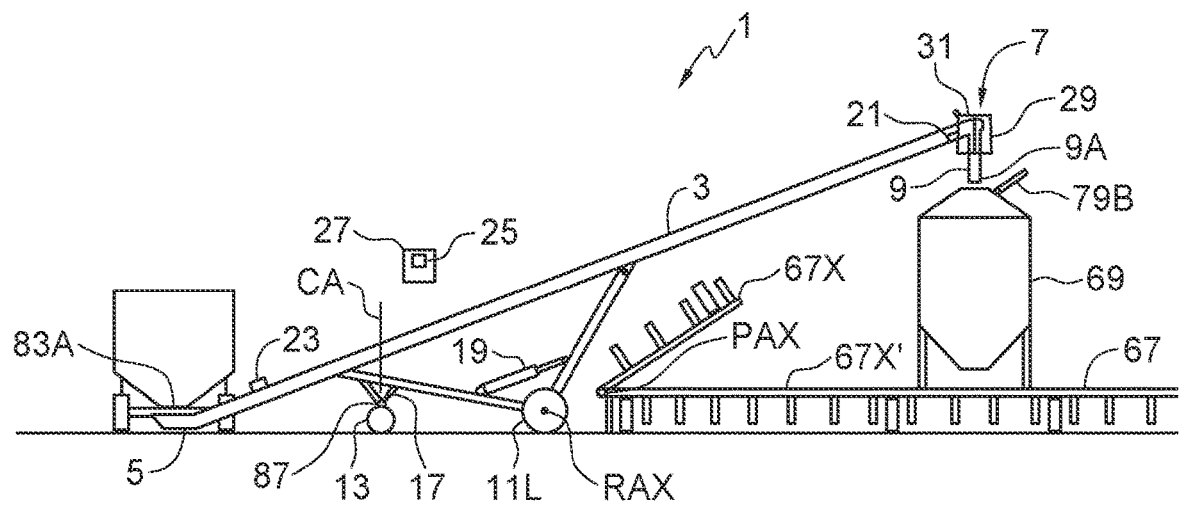
FIG. 1 is a schematic side view of an embodiment of the conveyor apparatus of the present disclosure set up to fill tanks on an air seeder cart.
Figure 2:
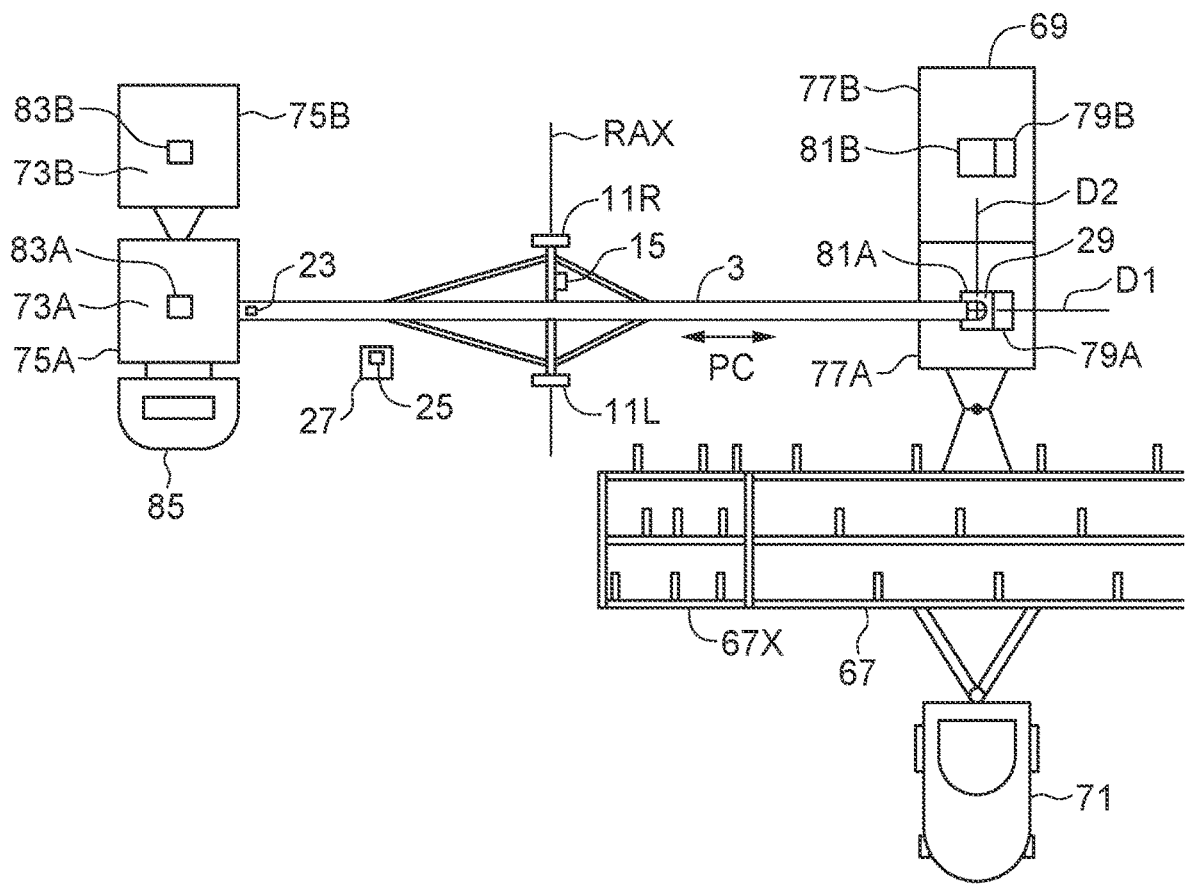
FIG. 2 is a schematic top view of the conveyor apparatus of FIG. 1.

FIGS. 1 and 2 schematically illustrate an embodiment of a conveyor apparatus 1 of the present disclosure comprising a conveyor 3 sloping upward from a lower conveyor intake 5 to an upper conveyor discharge 7 and with a downspout 9 extending down from the conveyor discharge 7. Right and left conveyor drive wheels 11R, 11L and a caster wheel 13 support the conveyor 3, and a wheel drive 15 is operative to rotate the right and left drive wheels 11R, 11L together about a rotational axis RAX oriented substantially perpendicular to a length of the conveyor 3 such that the conveyor 3 moves along a path PC substantially aligned with the length of the conveyor 3.

An intake elevator 17 moves the caster wheel 13 up and down to selectively raise and lower the conveyor intake 5, and a discharge elevator 19 is operative to selectively raise and lower the conveyor discharge 7. A discharge camera 21 is oriented to look downward from the conveyor discharge 7 and send discharge images to a camera display 25, and an intake camera 23 is oriented to look at the conveyor intake 5 and send intake images to the camera display 25. The camera display 25 will typically be visible on a portable screen 27 that is connected wirelessly to the discharge camera 21 and the intake camera 23.

The wheel drive 15, the intake elevator 17, the discharge elevator 19, and the conveyor 3 can be remotely operated from the tractor or from a mobile device such as phone or pad that incorporates the portable screen 27 as well. A screen can also be provided in the tractor 71.

A downspout control 29 is operative to remotely move a bottom end of downspout 9A radially with respect to the conveyor discharge 7. In the illustrated embodiment the downspout control 29 can move the bottom end 9A of the downspout 9 in a first direction D1 and in a second direction D2 laterally to the first direction D1, typically generally perpendicular to the first direction D1, so that by manipulating the movements in each direction the bottom end 9A of the downspout 9 can be placed at any point radially, within a given range, from the discharge 7.

Figure 3:
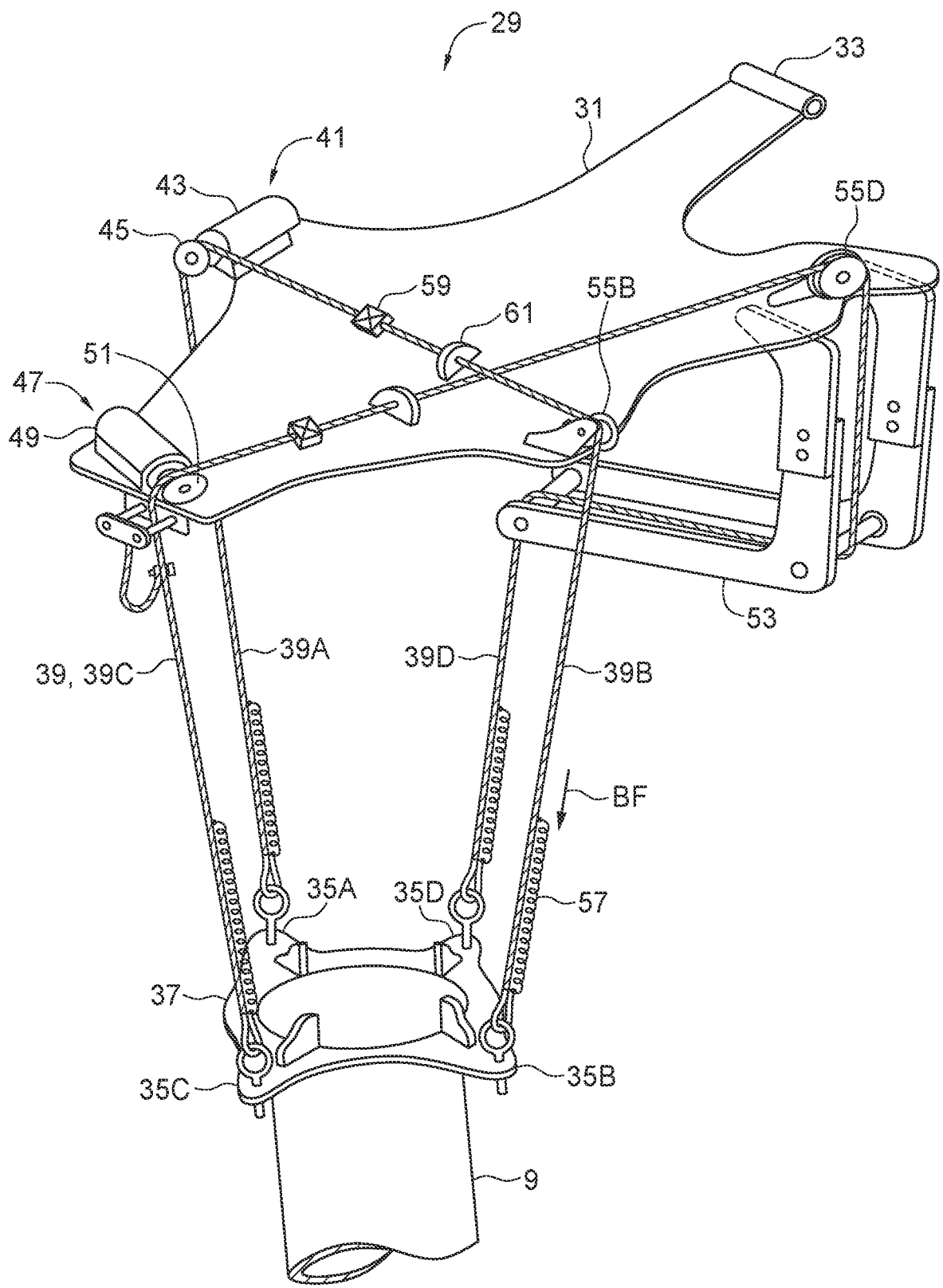
FIG. 3 is a schematic perspective view of an embodiment of a downspout control for adjusting the radial position of the bottom end of the downspout with respect to the discharge of the conveyor.

FIG. 3 schematically illustrates an embodiment of the downspout control 29 that comprises a base 31 configured to be mounted above the conveyor discharge 7 at bracket 33 such that the base 31 extends out over the discharge 7. The bracket 33 is a pivotal bracket allowing the base to fold upward to allow maintenance to the conveyor discharge 7. First and second attachment points 35A, 35B are fixed on opposite sides of the downspout 9 below the conveyor discharge 7, and third and fourth attachment points 35C, 35D are fixed on opposite sides of the downspout 9 below the conveyor discharge 7 and between the first and second attachment points 35A, 35B. In the illustrated apparatus the attachment points are fixed to a sleeve 37 that is in turn attached to the downspout 9. The portion of the downspout 9 above the sleeve 37 has been removed for illustration purposes.

An A-tether 39A extends from the first attachment point 35A up to the base 31, and a B-tether 39B extends from the second attachment point 35B up to the base 31, and an AB drive 41 is mounted on the base 31 and is operative in a forward mode to move the A-tether 39A upward while moving the B-tether 39B substantially the same distance downward, and is operative in a rearward mode to move the A-tether 39A downward while moving the B-tether 39B substantially the same distance upward.

Similarly a C-tether 39C extends from the third attachment point 33C up to the base 31, and a D-tether 39D extends from the fourth attachment point 35D up to the base 31, and a CD drive 47 is mounted on the base 31 and is operative in a forward mode to move the C-tether 39C upward while moving the D-tether 39D substantially the same distance downward, and is operative in a rearward mode to move the C-tether 39C downward while moving the D-tether 39D substantially the same distance upward.

The AB drive 41 comprises an A-motor 43 turning an AB spindle 45, and the A-tether 39A and B-tether 39B are connected to the AB spindle 45, and the CD drive 47 comprises a C-motor 49 turning a CD spindle 51, and the C-tether 39C and D-tether 39D are connected to the CD spindle 51.

In the downspout control 29 shown in FIG. 3, the A-tether 39A and B-tether 39B are connected together to essentially form a single tether AB and then wrapped around the AB spindle 45 a few times such that as the A-tether 39A moves upward the B-tether 39B moves downward, and vice versa. Similarly the C-tether 39C and D-tether 39D are connected together to essentially form a single tether CD and wrapped around the CD spindle 51 such that as the C-tether 39C moves upward the D-tether 39D moves downward, and vice versa.

The AB spindle 45 is mounted on the base 31 such that the A-tether 39A extends down from the AB spindle 45, and the B-tether 39B extends across the base to a B-pulley 55B and extends downward from the B-pulley 55B. Similarly the CD spindle 51 is mounted on the base 31 such that the C-tether 39C extends down from the CD spindle 51, and the D-tether 39D extends across the base to a D-pulley 55D and then extends downward from the D-pulley 55D.

Depending on the configuration of the base 31, it may be required to provide a guide 53 where one of the tethers, here illustrated as the D-tether 39D, extends over the guide 53 to move the D-tether to an orientation with respect to the downspout 9 that is substantially the same as the orientation of the A-tether 39A, C-tether 39C, and B-tether 39B.

In the downspout control 29 as the A-tether moves upward in response to the rotation of the AB drive, some slack may develop in the opposite B-tether which can cause the AB tether to slip on the AB spindle. FIG. 3 shows a tension spring 57 on each of the tethers 39. These tension spring 57 are in tension exerting a bias force BF which maintains a tension on the AB spindle and the CD spindle to reduce such slippage should one of the tethers 39 go slack.

FIG. 3 also shows tether stops 59 and base stops 61 that define the given range of motion within which the downspout 9 can be placed radially from the discharge 7. The tether stops 59 will bind against the base stops 61 on one end and the spindles on the other end so that the tethers slip on the spindles and limit movement beyond the limits.

Figure 4:
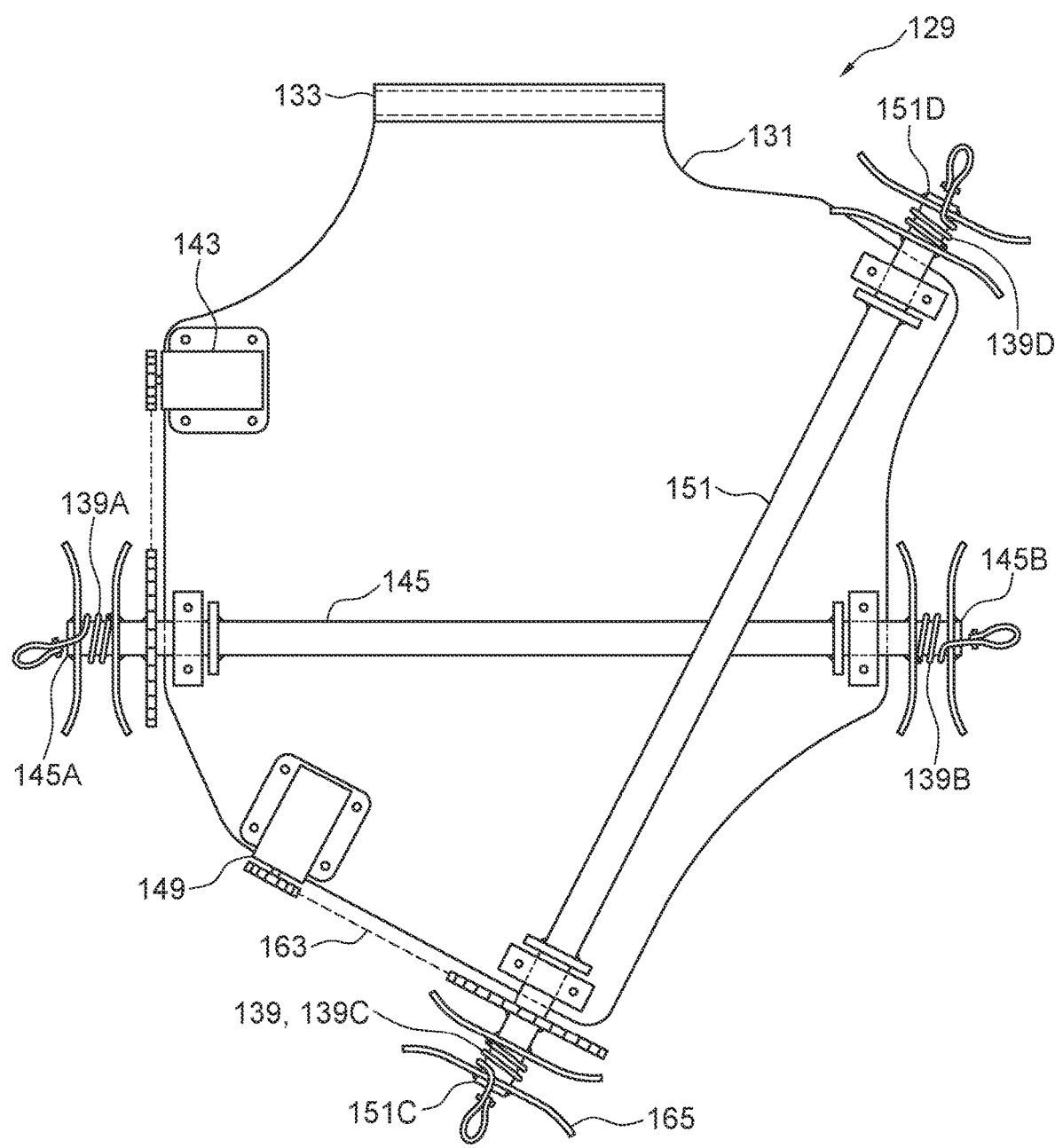
FIG. 4 is a schematic top view of an alternate embodiment of a downspout control for adjusting the radial position of the bottom end of the downspout with respect to the discharge of the conveyor.

FIG. 4 shows an alternate embodiment of a downspout control 129 where the base 131 is attached to the discharge of the conveyor at bracket 133. Here the AB spindle 145 extends across the base 131 and wherein the A-tether 139A is connected to the AB spindle 145 at an A-end 145A of the AB spindle 145 and the B-tether 139B is connected to the AB spindle 145 at a B-end 145B of the AB spindle 145 such that as the motor 143 rotates the A-tether 139A moves upward and the B-tether 139B moves downward and vice versa. Similarly the CD spindle 151 extends across the base 131 and the C-tether 139C is connected to the CD spindle 151 at a C-end 151C of the CD spindle 151 and the D-tether 139D is connected to the CD spindle 151 at a D-end 151D of the CD spindle 151 such that as the motor 149 rotates the C-tether 139C moves upward and the D-tether 139D moves downward and vice versa.

The motors 143, 149 drive the corresponding spindles 145, 151 through a belt or chain 163. Sheaves 165 maintain the tethers 139 on the spindles as they rotate back and forth. In order to help to keep the conveyor 3 moving substantially straight back and forth along the conveyor path PC the apparatus 1 also includes a caster wheel lock 87, provided by a removable pin or the like, that is operative to selectively prevent the caster wheel 13 from swiveling on the caster axis CA and locks the caster wheel 13 in a position where the caster wheel 13 rolls along the conveyor path PC. The caster wheel lock 87 may also be remotely controlled.

Figure 6:
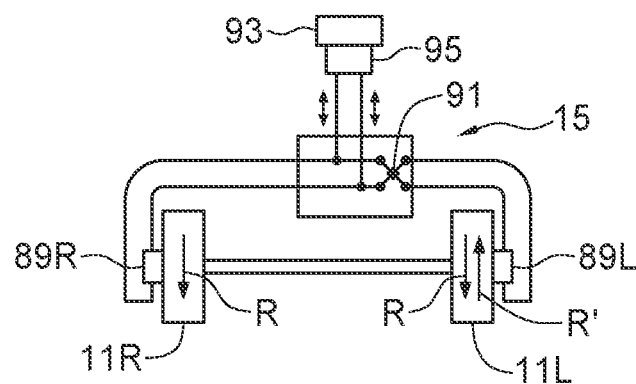
FIG. 6 is a schematic view of a wheel drive that is operative in a path mode and in a swing mode.

In order to provide added maneuverability, the wheel drive 15 of the apparatus 1 schematically illustrated in FIG. 6 is operative, when in a swing mode, to rotate the right wheel 11R in a direction R opposite to a rotational direction R' of the left wheel 11L. The wheel drive 15 comprises a right hydraulic motor 89R driving the right drive wheel 11R, and a left hydraulic motor 89L driving the left drive wheel 11L. A swing valve 91 is movable from a path mode, where pressurized hydraulic fluid from a pump 93 is directed to the right and left hydraulic motors 89R, 89L such that same are rotated together in the same direction R at the same speed, to a swing mode where pressurized hydraulic fluid from a pump 93 is directed to opposite sides of the right and left hydraulic motors 89R, 89L such that the left hydraulic motor 89L is rotated in an opposite direction R' to that of the rotation R of the right hydraulic motor 89R and again at the same speed. A reversing valve 95 between the pump 93 and the swing valve 91 is operated to reverse the direction of flow from the pump to the valve 91 to provide forward or reverse rotation of the right and left hydraulic motor 89R, 89L. The swing valve 91 and reversing valve 95 may be remotely controlled as well to maneuver the conveyor from a distance.

Figure 7:
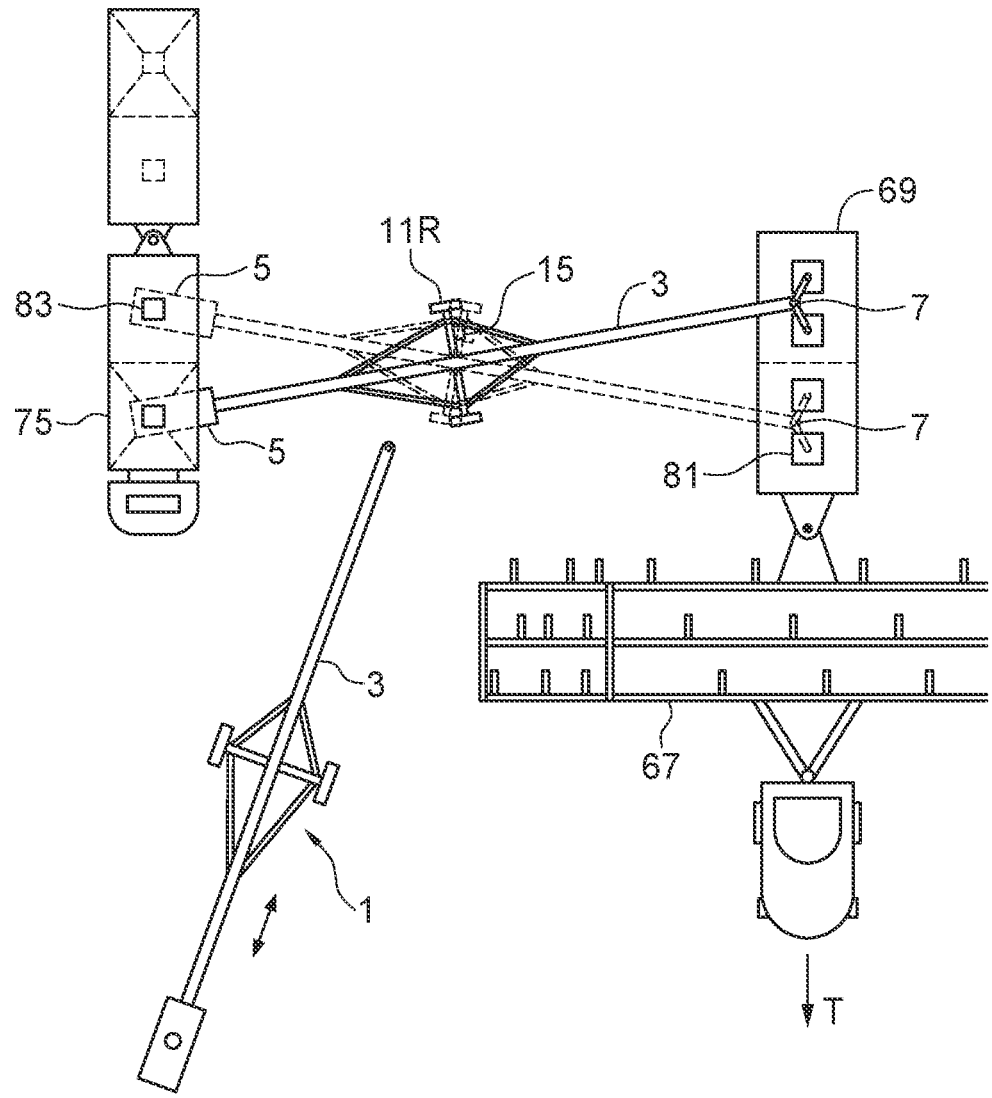
FIG. 7 schematically illustrates a conveyor maneuvering between a transport vehicle and a furrow opener implement and into an operating position.

FIG. 7 schematically shows how the wheel drive 15 of FIG. 6 can be used to maneuver a conveyor 3 between a transport vehicle 75 and a furrow opener implement 67 into an operating position with the intake 5 under the transport vehicle 75 and the downspout oriented to discharge into a tank on an air seeder cart 69. FIG. 7 also shows how the downspout control 29 can be used, where the fill openings 81 are within range, to fill two tanks with the same agricultural product from the same compartment on a transport vehicle 75.

Using the swing valve 91, the right drive wheel 11R can then be rotated opposite to the left drive wheel 11L to swing the intake under the discharge chute 83 of a different compartment on the transport vehicle 75 while moving the conveyor discharge 7 and the downspout 9 into position to fill different tanks on the air seeder cart 69.

In an air seeder comprising a furrow opener implement 67 and an air seeder cart 69 towed by a tractor 71, the present disclosure further provides a method for transferring a first agricultural product 73A from a first transport vehicle 75A to a first tank 77A mounted on the air seeder cart 69 and transferring a second agricultural product 73B from a second transport vehicle 75B to a second tank mounted 77B on the air seeder cart 69.

The method comprises providing a conveyor 3 sloping upward from a lower conveyor intake 5 to an upper conveyor discharge 7 and with a downspout 9 extending down from the conveyor discharge 7, wherein the conveyor 3 is supported on right and left conveyor drive wheels 11R, 11L and on a caster wheel 13; providing a wheel drive 15 operative to rotate the right and left conveyor drive wheels together about a rotational axis RAX oriented substantially perpendicular to a length of the conveyor 3 such that the conveyor rolls along a conveyor path PC substantially aligned with the length of the conveyor 3; providing an intake elevator 17 operative to selectively raise and lower the conveyor intake 5, and a discharge elevator 19 operative to selectively raise and lower the conveyor discharge 7; providing a discharge camera 21 mounted on the conveyor 3 and oriented to look downward from the conveyor discharge 7 and send discharge images to a camera display 25 and an intake camera 23 mounted on the conveyor 3 and oriented to look toward from the conveyor intake 5 and send intake images to the camera display 25; opening a first lid 79A covering a first fill opening 81A on the first tank 77A and opening a second lid 79B covering a second fill opening 81B on the second tank 77B prior to transferring the first and second agricultural products 73A, 73B; positioning the first transport vehicle 75A, the conveyor 3, and the air seeder cart 69 such that the conveyor intake 5 receives the first agricultural product 73A from a discharge chute 83A of the first transport vehicle 75A and adjusting a radial position of a bottom end 9A of the downspout 9 with respect to the conveyor discharge 7 and with respect to the first fill opening 81A such that the first agricultural product 73A is directed into the first fill opening 81A; operating the conveyor 3 and starting a flow of the first product 73A from the first transport vehicle 75A to deposit the first agricultural product 73A into the conveyor intake 5 while monitoring the conveyor intake on the camera display 25; monitoring the discharge of the first agricultural product 73A into the first fill opening 81A on the camera display 25 and when the first agricultural product 73A in the first tank 77A reaches a desired level, stopping the flow of the first product 73A from the first transport vehicle 75A and continuing to operate the conveyor 3 until the conveyor 3 is substantially empty; raising the conveyor discharge 7 and rolling the conveyor 3 along the conveyor path PC towards the air seeder cart 69; moving the first transport vehicle 75A away from the air seeder cart 69 and moving the second transport vehicle 75B such that a discharge chute 83A of the second transport vehicle 75B is substantially aligned along the conveyor path PC with the conveyor 3; rolling the conveyor 3 along the conveyor path PC toward the second transport vehicle 75B and moving the air seeder cart 69 until the intake images show that the conveyor intake 5 is in a position to receive the second agricultural product 75B from a discharge chute 83B of the second transport vehicle 75B and the discharge images indicate that the second fill opening 81B is within reach of the downspout 9; using the downspout control 29 to remotely adjust the radial position of the bottom end 9A of the downspout 9 with respect to the conveyor discharge 7 while lowering the conveyor discharge 7 to a position where the second agricultural product 73B discharged from the downspout 9 enters the second fill opening 81B; starting the conveyor 3 and starting a flow of the second product 73B from the second discharge chute 83B to deposit the second agricultural product 73B into the conveyor intake 5 while monitoring the conveyor intake 5 on the camera display 25; monitoring the discharge of the second agricultural product 73B into the second fill opening 81B on the camera display 25 and when the second agricultural product 73B in the second tank 77B reaches a desired level, stopping the flow of the second product 73B from the second discharge chute 83B and continuing to operate the conveyor 3 until the conveyor is substantially empty; and raising the conveyor discharge 7 and closing the first and second lids 79A, 79B.

Figure 5:
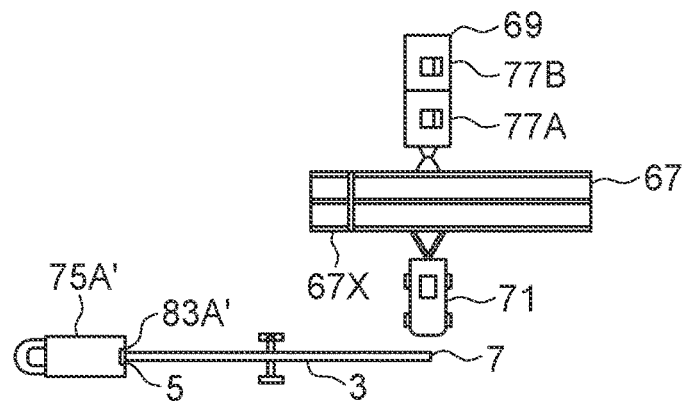
FIG. 5 is a schematic top view of an air seeder approaching a conveyor set up to convey first agricultural product from a first transport vehicle.

The method is schematically illustrated in FIG. 5. In the illustration of FIGS. 1 and 2 the first and second transport vehicle 75A, 75B are shown as two vehicles towed together by a truck 85, where the conveyor 3 is rolled along the conveyor path PC toward the air seeder cart 69 to allow the rear wheels of the first transport vehicle 75A and the front wheels of the second transport vehicle 75B to pass over the conveyor path PC and then the conveyor 3 is rolled along the conveyor path CP toward the second transport vehicle 75B to position the conveyor intake 5 under the second discharge chute 83B.

FIG. 5 shows the use of the present method where the first transport vehicle 75A' has an end dump box with the discharge chute 83A' at the rear end of the transport vehicle. Initially the first transport vehicle 75A' and the conveyor 3 are positioned such that the conveyor intake 5 receives the first agricultural product 73A from the discharge chute 83A' of the first transport vehicle 75A' as seen in FIG. 5.

Figure 5A:
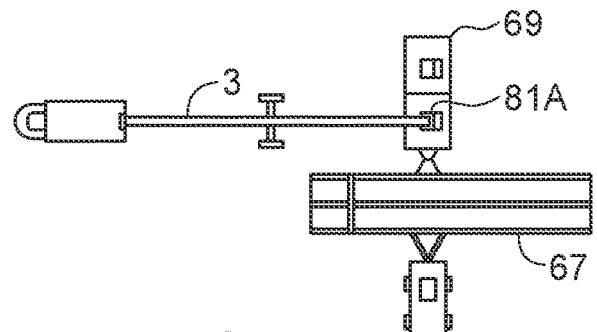
FIG. 5A is a schematic top view of the air seeder with the conveyor in position to discharge the first products into a first tank of the air seeder cart.

As shown also in FIGS. 1 and 2, the furrow opener implement 67 comprises a plurality of sections 67X that fold to a transport position. Outer sections 67X of the furrow opener implement 67 are connected to inner sections 67X' about pivot axes PA oriented substantially parallel to an operating travel direction T of the tractor 71. The method further comprises folding one of the outer sections 67X upward and inward as shown in FIG. 1 to allow the furrow opener implement 67 to be moved under the conveyor 3 to position the first fill opening 81A under the conveyor discharge 7 as shown in FIG. 5A.

Figure 5B:
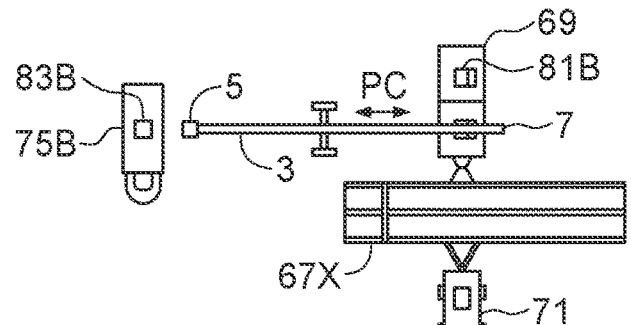
FIG. 5B is a top view of the conveyor moved over the air seeder to allow a second transport vehicle to move into position with the second discharge chute aligned with the conveyor path.

Once the first tank 77A is full, the conveyor discharge is moved upward and the conveyor 3 is rolled along the conveyor path PC toward the air seeder cart 69, as seen in FIG. 5B, and the first transport vehicle 75A' is moved away and the second transport vehicle 75B is moved into a position where the second discharge chute 83B is aligned with the conveyor 3 and the conveyor is then rolled along the conveyor path PC toward the second transport vehicle 75B so the intake 5 is under the second discharge chute 83B, which is shown as a center hopper discharge chute.

Figure 5C:
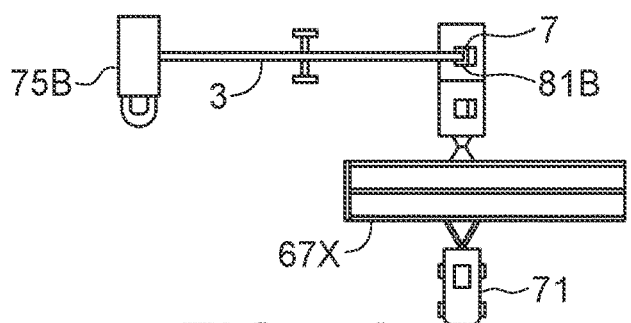
FIG. 5C is a schematic top view of the conveyor with the conveyor intake under the discharge chute of the second vehicle and the conveyor discharge oriented to direct the second agricultural product into the second tank.

The tractor 71 is then moved ahead to position the air seeder cart 69 so the second fill opening 81B is under the conveyor discharge 7, as seen in FIG. 5C, and the second agricultural product 73B is discharged into the second fill opening 81B until the desired level is reached, at which time the second discharge chute 83B is closed, the conveyor 3 is run until empty. The conveyor discharge 7 is then lifted, the lids 79A, 79B are closed, conveniently remotely from the tractor 71, and the tractor 71 moves the outer section 67X of the furrow opener implement 67 back down to an operating position and carries on seeding.

The desired level of the first agricultural product 73A in the first tank 77A can be determined by looking at the discharge images on the camera display 25. Where the fill opening 81A is large, it may be desired to adjust the radial position of the bottom end 9A of the downspout 9 to entirely fill the first tank 77A. Where two fill openings are relatively close together it may also be possible to use the downspout control 29 to fill two openings with the same agricultural product without moving anything but the downspout 9.

Where the desired level is a certain weight of the first agricultural product 73A, this can be determined either by weighing the first tank 77A or by weighing the first transport vehicle 75A. To ensure that the desired agricultural product is going into the desired tank on the air seeder cart 69, an identifier visible to the discharge camera 21 can be applied to each of the fill openings 81A, 81B indicating the agricultural product that is contained in the first and second bins 77A, 77B, and similar identifiers can be provided on the discharge chutes that are visible to the intake camera 23.

The discharge chutes 83A, 83A', 83B can also be remotely controlled from a mobile phone or the like. It is common to control all manner of processes from phones, pads, and the like.

With the method of the present disclosure an independent conveyor 3 can be quite conveniently be used to transfer agricultural product from transport vehicles to tanks on air seeder carts. These conveyors 3 can have high capacity since it is not required that they be mounted on the air seeder cart or to a transport vehicle, where same must be manipulated into filling position, and where weight is a significant factor.

With the present method one or two operators can fill the tanks air seeder cart with only two trips up to the top of the air seeder cart, one to open all the lids, and one to close. Where remote lid openings are available, there is no need to go to the top of the air seeder at all, as the discharge camera allows viewing to see that all is going as it should be. The downspout control allows for significant mis-alignment of the fill openings and the downspout.

The wheel drive is simple, requiring only back and forth movement along a conveyor path with no turning. Remotely controlling the wheel drive is also simple, and where the intake elevator, the discharge elevator, the conveyor, and the discharge chutes are remotely operated, significant movement back and forth by the operators is avoided.

Where only a single operator, such as the tractor driver doing the seeding operation, is available, the tractor driver can, for instance, leave the conveyor 3 and second transport vehicle 75B set up as shown in FIG. 5C, and when the next fill is needed the driver can simply drive under the raised discharge 7, and position the second fill opening 81B under the downspout 9 to receive the second agricultural product 73A. Where remote drives are available the driver can then start the conveyor 3 and open the second discharge chute 83B, all from the tractor seat. When the second tank 77B is loaded, the driver can then raise the discharge and roll the conveyor 3 along the conveyor path PC. Now the driver must leave the tractor 71 to move the second vehicle 75B away and move the first transport vehicle 75A into position with the discharge 83A aligned with the conveyor path P, and with a portable remote control, or from the tractor, roll the conveyor 3 back where the conveyor intake 5 is under the first discharge chute 83A. The driver can then go back to the tractor to move the first fill opening 81A under the discharge 7, fill the first tank 77A, raise the discharge 7, close the lids and go seeding. It can be seen that where a truck driver is available as well as the tractor driver, further economies of movement can be had.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. In an air seeder comprising a furrow opener implement and an air seeder cart, a method for transferring a first agricultural product from a first transport vehicle to a first tank mounted on the air seeder cart and transferring a second agricultural product from a second transport vehicle to a second tank mounted on the air seeder cart, the method comprising:

providing a conveyor sloping upward from a lower conveyor intake to an upper conveyor discharge and with a downspout extending down from the conveyor discharge;

wherein the conveyor is supported on right and left conveyor drive wheels and on a caster wheel;

providing a wheel drive operative in a path mode to rotate the right and left conveyor drive wheels together about a rotational axis oriented substantially perpendicular to a length of the conveyor such that the conveyor rolls along a conveyor path substantially aligned with the length of the conveyor;

providing an intake elevator operative to selectively raise and lower the conveyor intake, and a discharge elevator operative to selectively raise and lower the conveyor discharge;

providing a discharge camera mounted on the conveyor and oriented to look downward from the conveyor discharge and send discharge images to a camera display and an intake camera mounted on the conveyor and oriented to look toward the conveyor intake and send intake images to the camera display;

opening a first lid covering a first fill opening on the first tank and opening a second lid covering a second fill opening on the second tank prior to transferring the first and second agricultural products;

positioning the first transport vehicle, the conveyor, and the air seeder cart such that the conveyor intake receives the first agricultural product from a discharge chute of the first transport vehicle and adjusting a radial position of a bottom end of the downspout with respect to the conveyor discharge and with respect to the first fill opening such that the first agricultural product is directed into the first fill opening;

operating the conveyor and starting a flow of the first product from the first transport vehicle to deposit the first agricultural product into the conveyor intake while monitoring the conveyor intake on the camera display;

monitoring the discharge of the first agricultural product into the first fill opening on the camera display and when the first agricultural product in the first tank reaches a desired level, stopping the flow of the first product from the first transport vehicle and continuing to operate the conveyor until the conveyor is substantially empty;

raising the conveyor discharge and rolling the conveyor along the conveyor path towards the air seeder cart;

moving the first transport vehicle away from the air seeder cart and moving the second transport vehicle such that a discharge chute of the second transport vehicle is substantially aligned along the conveyor path with the conveyor;

rolling the conveyor along the conveyor path toward the second transport vehicle and moving the air seeder cart until the intake images show that the conveyor intake is in a position to receive the second agricultural product from a discharge chute of the second transport vehicle and the discharge images indicate that the second fill opening is within reach of the downspout;

remotely adjusting the radial position of the bottom end of the downspout with respect to the conveyor discharge while lowering the conveyor discharge to a position where the second agricultural product discharged from the downspout enters the second fill opening;

starting the conveyor and starting a flow of the second product from the second discharge chute to deposit the second agricultural product into the conveyor intake while monitoring the conveyor intake on the camera display;

monitoring the discharge of the second agricultural product into the second fill opening on the camera display and when the second agricultural product in the second tank reaches a desired level, stopping the flow of the second product from the second discharge chute and continuing to operate the conveyor until the conveyor is substantially empty;

raising the conveyor discharge and closing the first and second lids.

2. The method of claim 1 wherein the furrow opener implement comprises a plurality of sections that fold to a transport position, and wherein outer sections of the furrow opener implement are connected to inner sections of the furrow opener implement about pivot axes oriented substantially parallel to an operating travel direction of the furrow opener implement, and comprising:

positioning the first transport vehicle and the conveyor such that the conveyor intake receives the first agricultural product from a discharge chute of the first transport vehicle;

folding at least one of the outer sections upward and inward to allow the furrow opener implement to be moved under the conveyor;

moving the furrow opener implement under the conveyor and positioning the first fill opening under the conveyor discharge.

3. The method of claim 1 wherein the discharge chute of one of the first and second transport vehicles is a center hopper discharge chute.

4. The method of claim 1 wherein the discharge chute of one of the first and second transport vehicles is an end dump discharge chute.

5. The method of claim 1 wherein the desired level of the first agricultural product in the first tank is determined by weight.

6. The method of claim 5 wherein the weight of the first product is determined by one of weighing the first tank or weighing the first transport vehicle.

7. The method of claim 1 wherein the camera display is visible on a portable screen connected wirelessly to the discharge camera and the intake camera.

8. The method of claim 7 comprising locking the caster wheel in a position where the caster wheel rolls along the conveyor path.

9. The method of claim 1 comprising opening the first and second lids remotely.

10. The method of claim 1 wherein the wheel drive, the intake elevator, the discharge elevator, and the conveyor are remotely operated.

11. The method of claim 1 wherein the discharge chute of the first transport vehicle and the discharge chute of the second transport vehicle are remotely controlled.

12. The method of claim 1 comprising applying an identifier visible to the discharge camera indicating the agricultural product contained in the first and second bins.

* * * * *